United States Patent [19]
Croswhite et al.

[11] 4,393,731
[45] Jul. 19, 1983

[54] INFINITELY VARIABLE BELT-DRIVE TRANSMISSION

[75] Inventors: Howard L. Croswhite; Po-Lung Liang, both of Livonia; Alan R. Fisher, Dearborn, all of Mich.

[73] Assignee: Ford Motor Company, Dearborn, Mich.

[21] Appl. No.: 186,944

[22] Filed: Sep. 15, 1980

[51] Int. Cl.³ .................. F16H 37/08; F16H 57/10; F16H 47/08

[52] U.S. Cl. ....................... 74/689; 74/695; 74/730; 74/740

[58] Field of Search ............... 74/688, 695, 701, 730, 74/731, 732, 733, 740

[56] References Cited

U.S. PATENT DOCUMENTS

| | | | |
|---|---|---|---|
| 3,158,040 | 11/1964 | Moore | 74/688 |
| 3,173,311 | 3/1965 | Seliber | 74/731 |
| 3,526,305 | 9/1970 | August | 74/732 |
| 4,125,037 | 11/1978 | Palmer et al. | 74/732 |
| 4,304,150 | 12/1981 | Lupo et al. | 74/731 |
| 4,329,888 | 5/1982 | Falzoni | 74/689 |

*Primary Examiner*—Allan D. Herrmann
*Attorney, Agent, or Firm*—Donald J. Harrington; Frank G. McKenzie

[57] ABSTRACT

A continuously variable belt driven pulley system drives a torque converter followed by a planetary reversing speed reduction gearset another speed reduction unit and the differential, which distributes power to the drive wheels of the vehicle. The drive system of a motor vehicle according to a second aspect of the invention includes a continuously variable flexible belt-pulley system driving a reversing bevel or planetary gear set and a tandem fluid coupling, which functions as a limited slip differential and distributes power to the drivewheels of the vehicle through two speed reduction gearsets driven from two output shafts of the fluid coupling.

10 Claims, 3 Drawing Figures

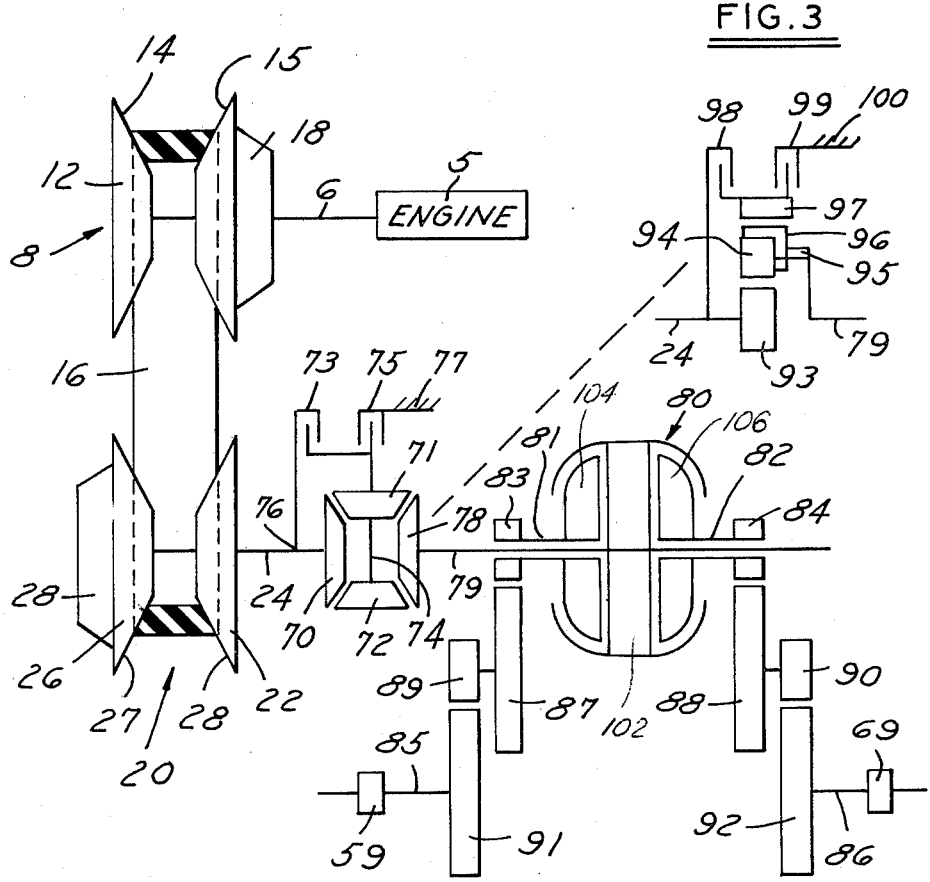

INFINITELY VARIABLE BELT-DRIVE TRANSMISSION

BACKGROUND OF THE INVENTION

1. Field of the Invention

This invention relates to power transmissions driven from an automotive engine which transmits power to the output shaft over a continuously variable stepless range of speed and torque multiplication. More particularly, the invention pertains to a continuously variable belt drive wherein the conventional start-up clutch is absent, but a torque converter or fluid coupling is driven from the continuously variable drive unit.

2. Description of the Prior Art

A continuously variable speed ratio transmission transmits power from an input shaft to an output shaft over a range of speed ratios that varies steplessly within a given range. A device for producing this result may transmit power between the shafts by an endless, flexible belt or chain driven by a variable diameter pulley, the belt driving a second variable diameter pulley mounted on the output shaft.

Stepless variable speed ratio transmissions generally include a torque converter arranged to be driven directly from the engine. The continously variable device is driven by the torque converter and is followed by conventional gearing for producing a further speed reduction and a directional change between the sense of direction of the engine crankshaft and the output shaft of the transmission. An example of a transmission organized in this way is shown in U.S. Pat. No. 3,526,305.

This arrangement has two disadvantages, the first is that the transmission is longer in a direction parallel to the pulley shafts than is necessary. This results because the torque converter, the change direction gearing and one pulley of the belt drive are arranged to rotate about the same axis. A second disadvantage is evident upon stopping the vehicle under an emergency condition when the transmission is operating at the high speed ratio end of its available range. Continuously variable speed drives usually change speed ratio only when the drive mechanism is rotating, therefore, if the transmission is stopped while operating in the high end of its speed ratio range, the vehicle must be started in the high speed ratio which is at a distinct disadvantage.

Other arrangements of the principal drive elements of a transmission of the variable speed ratio type include a hydrokinetic torque converter driven directly from the engine of the vehicle followed by a continuously variable drive that may be a belt-pulley combination or a traction drive, and a gear set for producing a reverse direction to the output shaft. U.S. Pat. No. 4,125,037 shows a drive system having these components arranged in this sequence. Other arrangements of this transmission have the continuously variable drive located directly behind the engine, a torque converter located on the driving pulley shaft of the continuously variable drive and a reverse drive gear set immediately behind the driven pulley of the continuously variable speed drive. A third arrangement of the principal elements located for use with an engine transversely mounted in the vehicle has the torque converter driven from the engine, a traction drive located immediately behind and driven from the torque converter, and a reversing gear set whose output parallels the axis of the output shaft of the engine and transmits power directly to the drivewheels of the vehicle.

Frequently belt driven transmissions employ a centrifugal start-up clutch in the drive system, which acts to disengage the engine from the transmission until engine speed has increased sufficiently to engage the clutch to absorb the inertia of the transmission unit. This result, although an advantage in starting the engine from rest, raises the possibility that the transmission will disengage from the engine when the vehicle passes from cruise speed to a coast condition as frequently occurs in city driving. Furthermore, the inclusion of a start-up clutch of the centrifugal type would prevent fast but gentle rocking motions needed on ice and snow. When the engine is on fast idle as in cold starting conditions the centrifugal clutch tends to engage prematurely, but a hydrokinetic device would smooth the engagement avoiding abrupt torque application to the drive wheels.

SUMMARY OF THE INVENTION

A transmission for producing a stepless range of infinitely variable torque ratios between an input shaft and an output shaft according to our invention has an infinitely variable torque ratio drive unit driven directly from the engine. A hydrodynamic torque converter is driven by the variable speed ratio unit and a reversing set driven by the torque converter. This arrangement of drive units is augmented for use with a transversely mounted engine by an additional mechanical drive, either a chain or pulley type, that produces a further speed reduction and a bevel gear set differential connected directly to constant velocity joints that direct power and to the drive wheels of the vehicle.

A second arrangement of our invention for disposing transmission components to produce a range of infinitely variable torque ratios includes a drive unit for producing the infinitely variable torque ratios between the output shaft of the engine and the driven shaft, a reversing gear set driven by the variable torque ratio unit, a fluid coupling driven by the gear set adapted to act as a limited slip differential between the gear set and two speed reduction gear trains that transmit power from the fluid coupling to the drive wheels.

By locating the fluid coupling and the torque converter in the torque delivery path following the variable speed ratio unit the need for a start-up clutch is eliminated. The difficulties presented by locating the start-up clutch in the drive train between the engine and the infinitely variable drive unit in ice or snow are overcome. The hydrodynamic torque converter or fluid coupling smoothes engine pulses and in this way increases the service life of the endless belt used to transmit drive between the pulleys of the variable speed ratio device. The torque converter can be designed in a conventional manner to produce a speed reduction and to increase the overall ratio range beyond the range that the conventional belt driven variable speed ratio device will produce. In addition, torque multiplication of the converter is instantly available for bursts of acceleration, a distinct advantage when compared with the need for belt drive units to require a delay in producing a lower speed ratio in response to a demand for immediate acceleration.

A further advantage in locating the torque converter or fluid coupling in the position according to our invention is that these devices can be of the dual or tandem type, adapted to drive parallel, coaxial output shafts which transmits power to the drive wheels of the vehicle. In this way, they can be arranged to produce the effect of a limited slip differential between the drive wheels.

The sheaves of the belt driven continuously variable drive will rotate while the vehicle idles when the hydrokinetic unit is located behind rather than ahead of the belt. This facilitates adjusting the belt ratio for maximum performance before acceleration on starting. When the torque converter is positioned in the system as herein described the loads carried by the variable speed ratio drive belts will be lower than if the torque converter preceeded the stepless speed ratio unit. This advantage results because the torque multiplication associated with the torque converter is applied to the driveline after the drive belts instead of being applied before the belts.

Another important advantage in locating the hydrokinetic unit after the variable speed ratio belt drive is that the torque converter or fluid coupling is less likely to slip due to road loading. The hydrokinetic unit is sized to carry the large starting torque loads and therefore operates without slip at the lower loads of cruise conditions. Conventionally, the hydrokinetic unit is located immediately behind the engine and is designed to slip on starting, but slipping occurs also at highway speed causing a loss of two to four percent in operating efficiency.

BRIEF DESCRIPTION OF THE DRAWINGS

FIG. 2 illustrates schematically a second embodiment of the invention wherein the continuously variable speed ratio device drives a reversing gear set and a fluid coupling which acts as a limited slip differential.

FIG. 3 shows schematically a planetary reversing gear set that can be used in place of the bevel gear set shown in FIG. 2.

DESCRIPTION OF THE PREFERRED EMBODIMENTS

Figure 1:
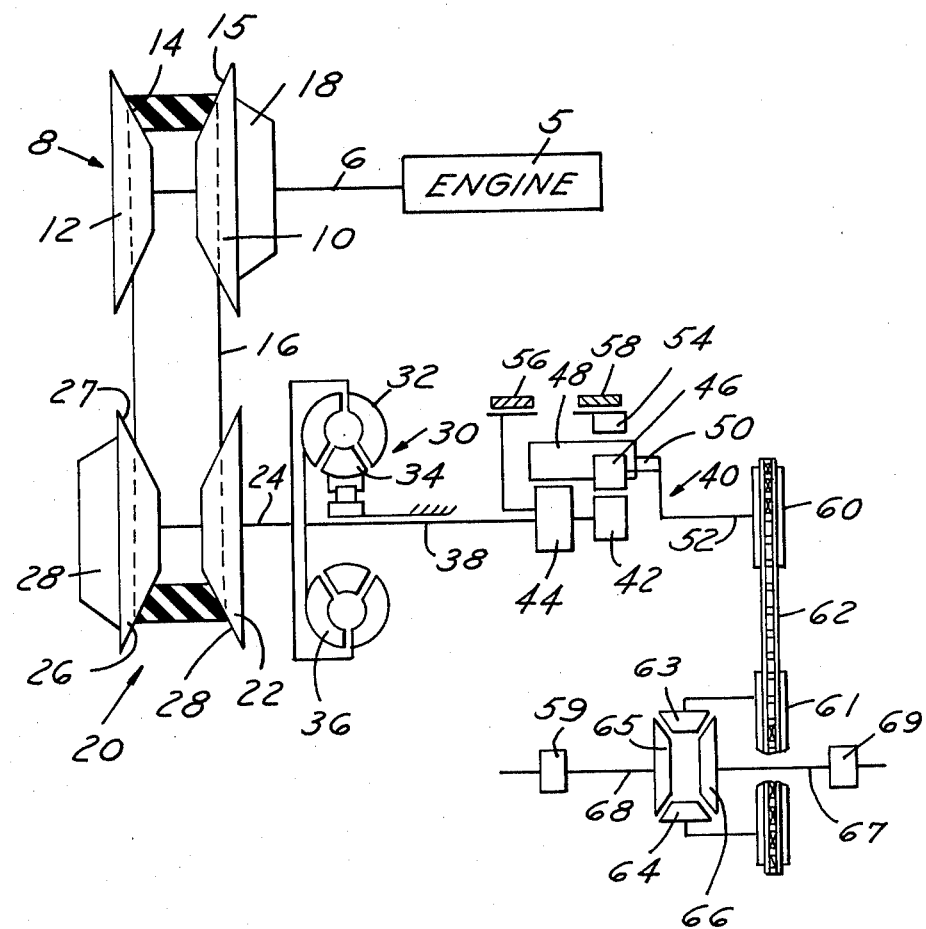
FIG. 1 shows a variable speed ratio pulley system driving a torque converter that transmits power directly to a planetary gear set and ultimately to the drive wheel of the vehicle.

Turning first to FIG. 1, the engine 5 of a motor vehicle is shown mounted in a transverse relationship with respect to the fore and aft axis of the vehicle. The output shaft 6 of the engine has a first sheave assembly 8 mounted thereon. A first pulley 10 is secured to the output shaft 6 and is driven in rotation about the axis of the shaft. A second pulley 12 is fixed to the shaft and has no independent motion with respect to the motion of the shaft. Pulleys 10, 12 have inwardly facing conical surfaces 14, 15, which receive the beveled edge surfaces of a flexible, endless drivebelt 16.

Pulley 10, however, is mounted on shaft 6 so that it can move axially on the shaft in response to the application of pressurized hydraulic fluid to a hydraulic control unit 18. Pulley 10 can move axially on the shaft over the range that will permit drivebelt 16 to be engaged with the conical surfaces 14, 15. When pulley 10 is moved to the right-hand extremity of its axial motion, belt 16, which has edge surfaces complementary to the conical surfaces of the pulleys 10, 12, moves radially inwardly toward the axis of the driveshaft 6 to a minimum effective diameter position. When pulley 10 is moved to the opposite extremity of its axial movement, drivebelt 16 moves upwardly on the conical surfaces 14, 15 into a larger effective diameter position on the pulleys 10, 12.

A second sheave assembly 20 has a first pulley 22 fixed to output member 24 for rotation with respect to the axis thereof. A second pulley 26 is secured to member 24 for rotation about its axis, but is permitted to slide axially along the axis. Pulleys 22, 26 have facing conical surfaces 27, 28 upon which the flexible drivebelt 16 maintains driving engagement. The axial movement of pulley 26 along the axis of output member 24 is controlled by the selective application of pressurized hydraulic fluid to a double acting cylinder located within the hydraulic control unit 28.

When the effective diameter of the drivebelt 16 increases due to inward axial movement of pulley 10 toward pulley 12, the effective diameter of drivebelt 16 on the surfaces 27, 28 must necessarily be reduced by outward axial movement of pulley 26 on the output member 24. Conversely, when the effective diameter of drivebelt 16 on conical surfaces 14, 15 is reduced by outward movement of pulley 10 in the direction away from pulley 12, pulley 26 must move toward pulley 28 so that drivebelt 16 will increase its effective diameter on the conical surfaces 27, 28. Accordingly, the rotational speed of output member 24 varies in relation to the speed of input shaft 6 as the effective diameter of drivebelt 16 on conical surfaces 14, 15 varies in relation to its effective diameter on conical surfaces 27, 28.

A hydrodynamic torque converter 30 has an impeller 32 secured to the output member 24, a reaction member 34 fixed against rotation and a driven member or turbine 36 secured to shaft 38. The three elements of the torque converter 32, 34, 36 are enclosed in a housing that is filled with hydraulic fluid. The impeller 32 imparts a whirling motion to the hydraulic fluid, the turbine 36 is driven in rotation by the whirling fluid and the reaction member 34 changes the direction of fluid motion between the turbine outlet and the impeller inlet so that the kinetic energy in the fluid will drive the impeller. The hydrokinetic torque converter 30 is of conventional design and is of the type wherein a torque magnification and speed reduction occurs.

A compound planetary gear set 40 has a first, small diameter sun gear 42 fixed securely to shaft 38 and a second, larger diameter sun gear 44 journalled on the shaft. First sun gear 42 is in continuous meshing engagement with a set of short planet pinions 46 journalled on a carrier 50, which is directly connected to shaft 52. The large diameter sun gear 44 is in meshing engagement with a set of long planet pinions 48 rotatably mounted on the carrier 50. The long planet pinion set 48 driveably engages the set of short planet pinions 46 and the internal teeth of a ring gear 54, an annular gear whose axis is coincident with the axis of shafts 38, 52.

A forward brake band 56 has one end fixed to the transmission housing (not shown) and a second end splined or otherwise fixed to the large diameter sungear 44. A reverse drive brake band 58 has one end fixed to the transmission case and a second end selectively connectable with the outer surface of a ring gear 54.

Shaft 52 has an output sheave 60 fixed thereto at its end. The sheave may provide a sprocket tooth arrangement on its outer surface engageable with the roller surfaces of a chain belt drive 62, which mutually engages a driven sheave 61 that is directly connected to bevel pinions 63. 64. The bevel pinions 63, 64 are in meshing engagement with bevel gears 65, 66, which are mounted for rotation on half shaft assemblies 67, 68 that typically have constant velocity universal joints 59, 69 as an integral part of the shaft assemblies. The half shafts 67, 68 are directly connected by way of the universal joints to the front wheels of the vehicle.

The torque converter 30 may produce a torque magnification of approximately 2.1:1 and the gear set 40, whether disposed for forward drive or reverse drive, may produce a torque multiplication of perhaps 2.5:1. The chain drive to the differential bevel pinions 63, 64 may produce a speed reduction of 2.0:1. The speed ratios associated with the gear set and the chain drive are, of course, constant speed ratio relationships. The range of infinitely variable torque ratios that can be produced by the sheave assemblies 8, 20 and the drivebelt 16 can produce a torque ratio that varies between 2.0:1 and 0.5:1.

In operation, when forward drive is required, the forward brake band 56 is applied thus fixing the large sun gear 44 against rotation and providing a pivot for the compound planetary gear set 40. Because ring gear 54 is free to turn, the set of long planet pinion 48 will revolve about the axis of shaft 38 thus revolving the carrier 50 upon which the set of long planet pinions 48 and short planet pinions 46 are rotatably mounted. The torque delivery path for forward drive ratio includes shaft 38, the smaller diameter sun gear 42, short planet pinions 46, the set of long planet pinions 48, and shaft 52.

The gear set can operate to produce a reverse drive at the same speed ratio as the forward drive. To produce this effect, forward brake band 56 is released and the reverse band 58 applied. This fixes ring gear 54 to the transmission housing and causes ring gear 54 to act as a pivot for the planetary gear set. The larger sun gear 44 is free to turn on the input shaft 38. Because ring gear 54 is fixed, rotation of the set of short planetary pinions 46 causes the set of longer planetary pinions 48 to revolve about the axis of shaft 38 on the ring gear 54. The torque delivery path for reverse drive includes shaft 38, sun gear 42, planetary pinions 46, 48, carrier 50 and shaft 52.

Sheave 60 is fixed to shaft 52 and drives output sheave 61 by way of the output drivebelt 62, which driveably engages the outer periphery of sheaves 60, 61. Drivebelt 62 may be a roller chain or a rubber belt adapted to positively engage driving surfaces on the circumference of sheaves 60, 61 so that slippage of the belt on the sheaves can be controlled to an absolute minimum. Alternatively, drivebelt 62 may be a toothed chain whose teeth engages complementary recesses on the outer surface of sheaves 60, 61.

A second embodiment, illustrated in FIG. 2 includes the engine 5 and sheave assemblies 8, 20 previously described with reference to the embodiment of FIG. 1. In this case, however, shaft 24 driven from the second sheave assembly 20 drives a bevel gear 70, which is continuously engaged with bevel pinions 71, 72. These pinions are journalled on a common shaft 74, which terminates in a forward drive clutch 73 and a reverse drive brake 75. The opposite end of forward drive clutch 73 is splined or otherwise fixed at 76 to shaft 24. The opposite end of reverse drive brake 75 is fastened securely to the transmission casing at 77. Output bevel gear 78 is driven by bevel pinions 71, 72 and is fixed to shaft 79, which drives a dual fluid coupling 80.

Fluid coupling 80 connects driving shaft 79 to driven shafts 81, 82, which extend outwardly from the coupling in alignment with shaft 79 and have drive pinions 83, 84 fixed to the extremities thereof.

The fluid coupling 80 includes a cylindrical impeller 102 and two turbines 104, 106 driven by the impeller the rotary members being enclosed in a housing which is filled with hydraulic fluid. The impeller 102 has radially extending blades that may be formed arcuately. The turbines have radial blades arranged adjacent the impeller to complement the arcuate shape of the impeller blades. When the impeller is rotated, centrifugal force impells the fluid outwardly whereby its momentum is delivered to the blades of the turbines 104, 106 causing them to rotate. Usually, the torque on the output members 81, 82 is the same, but the speed of these shafts can be different from one another and from the speed of the input shaft 79 by the amount of slip present.

Output members 81 and 82 ultimately drive output shafts 85, 86, which transmit power to the drivewheels of the vehicle. Pinions 83, 84 drive intermediate gears 87, 88, which have intermediate pinions 89, 90 mounted on a common shaft therewith. Pinions 89, 90 are driveably engaged with output gears 91, 92 which are fixed on the output shafts 85, 86, respectively.

In this arrangement the elements of the bevel gear set are sized to produce a direct drive connection without torque multiplication or speed reduction between shafts 24 and 79 during forward and reverse drive conditions. The double reduction gear train driven from the fluid coupling is sized to produce an 8:1 speed reduction between output members 81, 82 and output shafts 85, 86.

In operation, when forward drive is selected brake band 73 is applied thereby locking bevel pinions 71, 72 to shaft 24 and in this way causing shaft 79 to be driven at the same speed and in the same direction as shaft 24. To produce reverse drive, forward brake band 73 is released and reverse brake band 75 is applied to fix bevel pinions 71, 72 to the transmission casing at 77 against revolution about the axis of shaft 24. Drive is transmitted by shaft 24 to bevel gear 70, then, due to the symmetry of the gear arrangement, equally to pinions 71, 72 and finally to output bevel gear 78, which rotates opposite the direction of shaft 24.

In place of the bevel gear set the planetary gear set shown in FIG. 3 can be used as well to produce forward or reverse drive without speed reduction by the selective application of a brake and a clutch. In this instance, shaft 24 drives sun gear 93, which driveably engages a first planetary pinion set 94 mounted for rotation on a carrier 95. Carrier 95 is fixed to shaft 79, which drives the dual fluid coupling 80. A second planet gear set 96 is in mesh with the first planet gear set 94 and with ring gear 97, which encircles the planetary gear set. A forward drive clutch 98 selectively connects ring gear 97 to shaft 24. The reverse drive brake 99 has one end fixed to the transmission casing at 100 and the other end selectively engageable with ring gear 97.

Forward drive through the planetary gear set occurs when forward clutch 98 is actuated. This locks ring gear 97 to the sun gear 93 causing carrier 95 to drive output shaft 79. Reverse drive results when forward clutch 98 is released and reverse brake 99 applied. This action locks ring gear 97 against rotation. As sun gear 93 is driven, planet pinion set 96 rotates about ring gear 97 thus driving carrier 95 in rotation and transmitting power to shaft 79.

Changes and modifications in the specifically described embodiments can be carried out without departing from the scope of the invention, which is intended to be limited by the scope of the appended claims.

Having described a preferred embodiment of our invention what we claim and desire to secure by U.S. Letters Patent is:

1. A motor vehicle transmission for producing a stepless range of torque ratios between an input member and an output member comprising:
   means connected to the input member for varying its torque ratio by steplessly changing the radial distance from the axes of the input member and its output member at which an endless, flexible belt driveably engages these members;
   a hydrodynamic torque converter connected to the output of the torque ratio producing means, adapted to multiply the torque output of the torque ratio producing means over at least a portion of its range; and
   a gearset connected to the output of the torque converter adapted to selectively produce forward drive or reverse drive at a constant torque multiplication.

2. The transmission according to claim 1 further including means driven by said reversing gear set for transmitting torque to the drive wheels of a vehicle.

3. The transmission according to claim 1 wherein said variable torque ratio producing means comprises a first sheave mounted for rotation about a first axis having spaced rotary members providing a first pair of oppositely facing conical surfaces at least one rotary member being adapted for axial movement on the first axis;
   a second sheave mounted for rotation about a second axis having spaced rotary members providing a second pair of oppositely facing conical surfaces at least one rotary member being adapted for axial movement on the second axis; and
   an endless flexible belt mounted driveably on the first and second pair of conical surfaces adapted to be driven by said first sheave and to drive said second sheave.

4. The transmission according to claim 3 wherein the second sheave is driven in rotation at a speed that varies with respect to the speed of the first sheave according to variations in the effective diameters at which said belt engages the first and second sheaves.

5. The transmission according to claim 3 wherein the second sheave is driven in rotation at a speed that varies with respect to the speed of the first sheave according to variations in the position of one rotary member of each pair of rotary members with respect to the other rotary member of the pair.

6. The transmission according to claim 1 wherein the hydrodynamic torque converter is adapted to produce a speed reduction and torque multiplication.

7. The transmission according to claim 1 further comprising a final drive unit including:
   a driven member fixed to the output member;
   a differential unit adapted to be driven by said output member and to transmit power to the drive wheels of the vehicle;
   and means engaging said driven member for transmitting power to said differential unit.

8. The transmission according to claim 7 wherein said engaging means includes:
   an output sheave;
   an output drive belt driveably engaged with said driven member and said output sheave whereby power is transmitted to said output sheave; and
   means for driveably connecting said output sheave to said differential unit whereby power is transmitted from said output sheave through said differential unit to the drive wheels of the vehicle.

9. The transmission according to claim 1 wherein said gearset produces the same speed at its output as the speed at which it is driven by said variable torque ratio means during forward drive and reverse drive.

10. The transmission according to claim 1 wherein said gearset has one drive element adapted to be selectively held against rotation to produce forward drive and another drive element adapted to be selectively held against rotation to produce reverse drive.

* * * * *